(12) United States Patent
Bodog

(10) Patent No.: US 9,143,947 B2
(45) Date of Patent: Sep. 22, 2015

(54) GEOGRAPHICAL DETERMINATION OF COVERAGE IN COMMUNICATIONS SYSTEMS

(75) Inventor: Gyula Bodog, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 516 days.

(21) Appl. No.: 13/520,366

(22) PCT Filed: Jan. 8, 2010

(86) PCT No.: PCT/EP2010/050166
§ 371 (c)(1),
(2), (4) Date: Aug. 22, 2012

(87) PCT Pub. No.: WO2011/082831
PCT Pub. Date: Jul. 14, 2011

(65) Prior Publication Data
US 2012/0309431 A1    Dec. 6, 2012

(51) Int. Cl.
*H04W 24/00* (2009.01)
*H04W 16/18* (2009.01)
(Continued)

(52) U.S. Cl.
CPC ............... *H04W 16/18* (2013.01); *H04W 8/22* (2013.01); *H04W 24/08* (2013.01)

(58) Field of Classification Search
CPC ....... H04W 16/18; H04W 8/22; H04W 24/08; H04W 64/00; H04W 4/02; H04L 29/08657; G06F 1/1626; G06F 1/1632; H04N 2007/145
USPC ........ 455/423, 414.1, 560, 424, 67.11, 556.2, 455/456.6; 370/338, 248, 252; 379/32.05, 379/93.02; 709/224, 230, 999.204
See application file for complete search history.

(56) References Cited

U.S. PATENT DOCUMENTS 6,236,365 B1 * 5/2001 LeBlanc et al. ................ 342/457
7,200,658 B2 * 4/2007 Goeller et al. ................. 709/224
8,594,674 B2 * 11/2013 Jung et al. ..................... 455/436
(Continued)

FOREIGN PATENT DOCUMENTS

CN    101060689 A    10/2007
CN    101420711 A    4/2009

OTHER PUBLICATIONS

CATT, "Minimisation of Drive Tests Models", R2-094312, XP-002602990, 3GPP TSG-RAN WG2 meeting #67, Shenzhen, China, Aug. 24-28, 2009, 3 pages.
(Continued)

*Primary Examiner* — Mahendra Patel
(74) *Attorney, Agent, or Firm* — Squire Patton Boggs (US) LLP

(57) ABSTRACT

A method of determining geographical determination of coverage in a mobile communications system by obtaining measurement data provided by a plurality of mobile terminals the method comprising the steps of: requesting terminal capability information from the subscriber terminals in a cell; obtaining the terminal capability information from the subscriber terminals; comparing the terminal capability information with capability requirement information; selecting selected subscriber terminals on the basis of their capability information; sending a trace activation command to the selected subscriber terminals; and receiving measurement data measured by the selected subscriber terminals.

16 Claims, 3 Drawing Sheets

(51) Int. Cl.
*H04W 8/22* (2009.01)
*H04W 24/08* (2009.01)

(56) References Cited

U.S. PATENT DOCUMENTS

2006/0293066 A1* 12/2006 Edge et al. ............... 455/456.3
2008/0165880 A1* 7/2008 Hyon et al. ............... 375/267
2012/0116677 A1* 5/2012 Higgison et al. ............ 701/518

OTHER PUBLICATIONS

Nokia Siemens Networks, Nokia Corporation, "Architectures Comparison", R2-097020, 3GPP TSG-RAN WG2 Meeting #68, Jeji, Korea, Nov. 9-13, 2009, 8 pages.

QUALCOMM Europe, "Management Aspects of Minimization of Drive Tests (MDT)", 3GPP TSG-RAN WG2 meeting #66bis, Los Angeles, CA, US, Jun. 29-Jul. 3, 2009, 3 pages.

QUALCOMM Europe: (email discussion reporter), "Email Discussion Summary (66b#7) LTE-UMTS: Minimisation of Drive Tests", R2-094291, XP-002603559, 3GPP TSG-RAN WG2 meeting #67, Shenzhen, China, Aug. 24-28, 2009, 35 pages.

3GPP TR 36.805 V1.0.1, "3rd Generation Partnership Project; Technical Specification Group Radio Access Network; Study on Minimization of Drive-Tests in Next Generation Networks; (Release 9)", Jun. 2009, 15 pages.

QUALCOMM, "On the Comparison of Architectures for Minimization of Drive Tests", S5-093444, 3GPP TSG-SA5 (Telecom Management) Meeting SA5#67, Aug. 31-Sep. 4, 2009, Vancouver, Canada, 3 pages.

3GPP TS 32.422 V9.0.1, "3rd Generation Partnership Project; Technical Specification Group Services and System Aspects; Telecommunication Management; Subscriber and Equipment Trace; Trace Control and Configuration Management (Release 9)", Jan. 2010, 82 pages.

3GPP TS 32.423 V9.1.1, "3rd Generation Partnership Project; Technical Specification Group Services and System Aspects; Telecommunication Management; Subscriber and Equipment Trace; Trace Data Definition and Management (Release 9)", Jan. 2010, 71 pages.

First Office Action dated Sep. 9, 2014 corresponding to Chinese Patent Application No. 201080065279.1 and English translation thereof.

* cited by examiner

GEOGRAPHICAL DETERMINATION OF COVERAGE IN COMMUNICATIONS SYSTEMS

This invention relates to geographical determination of coverage in wireless communications systems. It is particularly, but not exclusively, related to determination of coverage in mobile communications systems such cellular communications systems.

It should be noted in the following, the term "mobile terminal" generally refers to the actual user equipment used by a subscriber to communicate with a network over an air interface. However, it some context, it may also refer to a subscriber of a network operator. It is also known by the term "user equipment" (UE). The meaning of the term "mobile terminal" in any particular case will be evident from the context in which it is used.

An important aspect in network planning to provide a wireless communications system is in ensuring that a network provides the necessary coverage. This may be to provide even coverage or to provide uneven coverage for example better coverage being provided in areas in which there is the heaviest wireless communications traffic. Coverage in this sense is intended to refer generally to the signal strength experienced by a mobile terminal in a cell. Accordingly, it may also refer to the reliability of inter-cell handover.

Although there have been considerable improvements made in network planning over the past few years enabling a planned network to have the kind of coverage which is desired, the operation of a resulting network implemented according to such a plan may not be exactly as intended. For this reason, mobile network operators employ a procedure referred to as drive tests in which vehicles equipped with special testing equipment travel around the area covered by a mobile network and collect measurement data at different geographical locations in the form of parameters such as signal strength. This means that the mobile network operator can identify problems such as coverage holes or places where handover tends to fail and change the configuration of the network to ameliorate these problems, for example by adding base stations, or changing to beam orientation of existing base stations.

Carrying out drive tests to obtain measurement data is expensive and inconvenient both in terms of the cost of the necessary equipment and of employees' or contractors' time. Therefore, it is desired to minimise the amount of drive testing which is conducted. This is currently under discussion in 3GPP (3rd Generation Partnership Project). It has been proposed to use subscriber mobile terminals to provide measurement data related to quality of connection over an air interface between themselves and a radio access network (RAN) of a mobile network and to use this data in a network management system of the network in order to reduce the need to carry out drive tests. Although this may not completely eliminate the need for drive testing, it is hoped that if the majority of coverage assessments can be carried out based on measurement data obtained by the RAN in communicating with subscriber mobile terminals, there is scope for considerable cost savings. The capability to provide the necessary measurement data from subscriber mobile terminals to minimise the amount of drive testing required is referred to as minimisation of drive test (MDT) functionality.

In order for a particular subscriber mobile terminal to be suitable for use in the collection of measurement data related to the air interface connection quality and provide it to the network, it is desirable for the network to know the capabilities of that mobile terminal. Such capability information exists in two forms: inherent capabilities such as whether a particular mobile terminal has the capability to support MDT and to provide location information, and variable capabilities such as the battery level of the mobile terminal. Generally, it is preferred that the location information be provided in the form of global positioning system (GPS) data although it equally location information obtained as a result of cooperation between the mobile terminal and the network, such as that obtained by EOTD (Enhanced Observed Time Difference of arrival), can be provided. Accordingly, it will be understood that not all mobile terminals support MDT functionality. Some mobile terminals do not have the inherent capabilities. Some mobile terminals do not have, at a particular time, a sufficient level of one or more variable capabilities. In order for a mobile terminal to be desirable for use in collection of measurement data, it needs to be able to provide location data indicating its position, it needs to support MDT, and it needs to have a sufficiently high level of battery power. These capabilities or characteristics are referred to as UE capability information for MDT purposes and indicate the capabilities which are desired by a network operator, that is the network operator to which a subscriber using a particular mobile terminal has subscribed, in order for a particular mobile terminal to be considered suitable for it to carry out MDT related measurements.

Currently, it is intended that this UE capability information will be made available to elements of the RAN, for example base station elements such as e-Node Bs (eNBs) in long-term evolution systems or radio network controllers (RNCs) in third generation (3G) systems.

It should be noted that in the following, where the term eNB/RNC is used, it is referring to communications systems which can be 3G systems, LTE systems, or both systems.

It has been proposed to use trace functionality present within a network to gather the measurement data required for MDT. Trace functionality can be used in a number of ways including collecting measurement data in respect of a specific geographical area.

There are several different types of trace function in a cellular mobile system, such as tracing a native subscriber in a home network, tracing of a native subscriber roaming in another network, tracing a foreign subscriber in a home network, tracing of equipment based on a mobile terminal identifier such as an IMEI or IMEISV (international mobile equipment identity or international mobile equipment identity software version), and tracing activities of any equipment in a cell.

A subscriber trace is requested by an IRP Manager sending an ActivateTraceJob operation to an IRP Agent. This IRP Agent can forward the trace activation to an Home Subscriber Server (HSS) or visitor location register (VLR) of a mobile switching centre (MSC) Server, a serving gateway support node (SGSN) or a mobility management entity (MME) in case of a signaling based trace activation. This message contains an identification of the subscriber to be traced (such as an international mobile subscriber identity (IMSI)), parameters to identify what kind of trace are requested (which interfaces should be traced, what level of information should be collected), and an address of an entity which collects the trace records. If the trace activation is sent to the HSS, the HSS sends a MAP_ACTIVATE_TRACE_MODE message to the MSC Server/SGSN at which the subscriber is registered. The MSC Server/SGSN or MME forwards the Trace Activation signal to the radio network (base station controller (BSC)/RNC/eNB) that is serving the subscriber.

After the trace has been activated, the eNB/RNC reports all data that is relevant to the traced subscriber to a Trace Collection Entity (TCE). The collected data may include the MEASUREMENT REPORTs sent by the mobile terminal, Cell ID, and parameters of call set-up/handovers.

The trace may be set up in such a way that it is to continue on handover/relocation. In this case, the eNB/RNC informs the new eNB/RNC that a trace is active when handover is performed. The TCE then receives trace reports from the new eNB/RNC after handover/relocation has occurred.

When a cell trace is requested, the IRP Agent sends the trace activation signal to the RAN network element (eNB/RNC) indicating a list of cells where the trace is activated. After the trace has been activated, the eNB/RNC reports all data relevant to all mobile terminals operating within the cell to the TCE. The collected data can be the same as for the subscriber trace.

Trace functionality is one of a number of network capabilities which are not directly related to setting up and managing calls which are managed by the management architecture of a network. FIG. 1 shows a 3GPP management architecture in which the main functional blocks involved in the management of a network are presented. The architecture applies both to 3G and LTE systems. The architecture is arranged in a hierarchy having at a lowest layer discrete telecommunications entities referred to as network elements (NEs) which can be managed over a specific interface. In a 3G system, the NE may be an RNC. In an LTE system, the NE may be an eNB. Above the NE layer are element managers (EMs) which provide a package of end-user functions for the management of a set of closely related types of NEs. An EM can either be a functionality contained within a Domain Manager (DM) which provides element management functions and domain management functions for a sub-network or can be configured as part of an NE. The DMs (or EMs) are managed by Network Managers (NMs) which are responsible for the management of a network mainly via EMs but also possibly directly to the NEs. The NM layer communicates with the DM/EM layer over an interface referred to as a type 2 interface or Itf N. The combination of the EM layer and the NM layer is often referred to as the network management system. Finally, the NM layer communicates with Enterprise Systems which are information systems used by a network operator which are not directly related to telecommunications aspects and include functionalities such as call centres, fraud detection and prevention systems, and invoicing systems.

The Itf-N connects the network management system to EMs (located in either a DM or in an NE). This connection is made by means of Integration Reference Points (IRPs). An IRP referred to as a trace IRP supports the operations that are required for Subscriber and Equipment trace, Service Level Trace and Cell Traffic Trace functionalities. An NM is able to monitor a 3G-telecommunication network over the Itf-N using the trace IRP functionality. To provide the trace management capability for the network requires the NM and the EM to agree on the following:

The identification of the NEs and UE where Trace Session Activation is requested.

The identification of the files containing the trace records for retrieval by a TCE which is typically part on the NM.

The identification of the subscriber or equipment is provided in the trace record files in the case of subscriber and equipment trace. In the case of Cell Traffic trace, the cell identity is provided in the trace record file. In the case of trace in E-UTRAN, as neither the subscriber identity nor the equipment identity are provided to eNB, none of these identifiers are provided in the trace record files from the eNB.

Notification of available files containing trace records for retrieval by a collection point indicated by an IP address.

According to a first aspect of the invention there is provided a method of determining geographical determination of coverage in a communications system by obtaining measurement data provided by a plurality of subscriber terminals the method comprising the steps of:

requesting terminal capability information from the subscriber terminals in a defined area;

obtaining the terminal capability information from the subscriber terminals;

comparing the terminal capability information with capability requirement information;

selecting selected subscriber terminals on the basis of their capability information;

sending a trace activation command to the selected subscriber terminals; and receiving measurement data measured by the selected subscriber terminals.

The geographical determination of coverage may be determined by a network management system as a result of measurement data received as a result of a request for selected subscriber terminals to carry out and provide measurement data.

Preferably the defined area is at least one cell. It may be more than one cell.

Preferably the subscriber terminal is a mobile terminal.

The geographical determination of coverage may be carried out in a wireless communications system. It may be carried out in a mobile communications system such as a cellular communications system.

Preferably, when it is desired to carry out a coverage test for a particular area, a network management system is instructed to collect measurement data from a particular cell or particular cells.

Preferably, a network management system requests a network element to obtain terminal capability information. The network element may be in a radio access network. In one embodiment of the invention, the terminal capability information is provided to the network element to be used by that network element. In another embodiment of the invention, the terminal capability information is obtained by the network element and then provided to the network management system, or to a network management layer, to be used by that system, or in that layer.

In one embodiment of the invention, selected subscriber terminals are selected by a network element in a radio access network. In another embodiment of the invention, selected subscriber terminals are selected by a network management system.

The capability information may exist in two forms: inherent capabilities and variable capabilities. An inherent capability may be that the subscriber terminal is able to provide location data indicating its position. This may be provided by a GPS capability. Another inherent capability may be that the subscriber terminal is able to support MDT. A variable capability may be that the subscriber terminal has a sufficiently high level of battery power.

In an embodiment of the invention in which the terminal capability information is provided to the network element to be used by that network element, the trace activation command may be modified by the network element from a cell trace command, that is a command to communicate with the subscriber terminals served by a cell for the purpose of carrying out trace activation, into a plurality of individual trace commands to be sent to ones of selected subscriber terminals. The plurality of individual trace commands may be addressed to ones of the selected subscriber terminals by connection orientated signaling. They may be addressed by signaling carried out according to the RRC protocol.

The network element may use connection orientated signaling to request the capability information from the subscriber terminals it serves. Respective served subscriber terminals may send a capability information report via connection orientated signaling to the network element once they have gathered the relevant information concerning capabilities. They may also use it to send a trace log according to the network element.

In this embodiment of the invention, it may not be necessary to obtain an equipment or subscriber specific identifier as a result of sending a request for selected subscriber terminals to carry out and provide measurement data.

In an embodiment of the invention in which the terminal capability information is obtained by the network element and then provided to the network management system, or to a network management layer, to be used by that system, or in that layer, the trace command is a mobile identifier specific command. It may be a trace command based on an equipment or a subscriber identifier.

Preferably, the measurement data relates to quality of connection over an air interface between subscriber terminals and a radio access network.

The measurement data may be sent to a network in RRC MEASUREMENT REPORT messages.

The measurement data may be measured as a result of a network management system noticing that there is a problem in a cell. The measurement data may be measured when a network management system is commanded to do so.

The measurement data may be provided by an individual subscriber terminal as a trace log. A number of such trace logs may be collated at a network element into a trace record for sending on to a network management system. However, the network element may instead send individual trace records to the network management system in respect of individual subscriber terminals.

In one embodiment of the invention, selecting selected subscriber terminals is carried out by selection functionality present a network element in a radio access network. Alternatively, it may be present in a network management system.

The subscriber terminal may receive a trace activation and as a result provide measurement data which has been automatically measured by the subscriber terminal prior to receiving the trace activation. In response to the trace activation the subscriber terminal may provide a report including the measurement data. Measurement data may be measured at the occurrence of pre-defined triggers, for example a periodic trigger and/or a failure event. In a variant of the invention, the subscriber terminal receives a trace activation and then measures measurement data and provides these to a network.

The request for selected subscriber terminals to carry out and provide measurement data may be sent by a manager function. The manager function may be in a network management layer. The manager function may send the request to an agent function. The agent function may be in an element management layer. The request may be forwarded by the agent function to an appropriate network element in a core network. The network element in the core network may be configured to obtain the subscriber terminal capabilities of the subscriber terminals that are registered in the desired geographical area.

The manager function may activate a trace based on an identifier of the subscriber terminal or of a subscriber.

This may be done by sending a trace activation to the agent function. The agent may forward the trace activation to one or more network elements in the core network.

In another embodiment of the invention, policy information relating to subscriber terminal capability requirements, such as the desired capabilities required for participating in measurement data collection and/or delivery, is transferred from a network management system to a network element in a radio access network. The presence of the capability requirements may act as an implicit instruction to the network element that it is to get subscriber terminal capability information from the subscriber terminals it is serving. However, there might be an additional explicit parameter instructing the network element to do this. It will therefore be understood that the network element needs to be specifically configured so that it can respond correctly to the request.

The subscriber terminal capability information may be obtained from subscriber terminals in the relevant geographical area by the network element. The network element may use the policy information to determine which subscriber terminals are to be used to provide measurement data.

The network element may initiate a cell based request for those subscriber terminals that are in the relevant geographical area to provide capability information. Following selection, the network element may generate a plurality of trace activations based on the cell based request and then initiate separate traces in respect of individual ones of the selected subscriber terminals.

The request for selected subscriber terminals to carry out and provide measurement data may be initiated by a manager function. The request may be send to an agent function. The request may contain operator policy information relating to criteria of the kinds of subscriber terminals which should participate in collecting measurement data.

The request may be a modified version of an ActivateTraceJob command. It may be modified to contain subscriber terminal capability requirements as an additional parameter or set of parameters.

The request may be forwarded by the agent function to an appropriate network element in the radio access network. The network element may be configured to obtain the subscriber terminal capabilities of the subscriber terminals that are registered in the desired geographical area.

The network element may refer to the network operator policy information and compare it to the capability information of the subscriber terminals in order to select subscriber terminals which are suitable to be used to provide measurement data. Once subscriber terminals have been selected, the network element may configure them for data collection by sending to them a trace activation.

A trace activation may contain a trace reference and an address of a relevant entity in a network management system which is to receive a trace log. It may contain additional information, for example that the trace is related to an MDT operation, and/or an indication of whether it is necessary for the subscriber terminal to include location data with the measurement data when it sends a trace log. In response to receiving the trace activation, a selected subscriber terminal may start measuring the measurement data. It may save GPS data together with the measurement data.

The mobile terminal may send the measurement data to the network element in an RRC MEASUREMENT REPORT message. This may be a message of this type modified to contain additional subscriber terminal measurement data together with location data. In another embodiment of the invention, additional subscriber terminal measurement data together with the GPS data is sent in a new RRC signaling message rather than in a modified RRC MEASUREMENT REPORT message.

According to a second aspect of the invention there is provided a communications system capable of determining geographical coverage by obtaining measurement data provided by a plurality of subscriber terminals comprising:
a network management system;
a radio access network comprising at least one network element; and
a selection functionality;
the network element being capable of requesting terminal capability information from the subscriber terminals in a defined area;
the network element obtaining the terminal capability information from the subscriber terminals;
the selection functionality being capable of comparing the terminal capability information with capability requirement information and selecting selected subscriber terminals on the basis of their capability information;
the network management system being capable of sending a trace activation command to subscriber terminals; and
the network management system being capable of receiving the measurement data.

According to a third aspect of the invention there is provided a network management system capable of requesting and obtaining measurement data provided by a plurality of subscriber terminals in order to determine geographical determination of coverage in a communications system:
the network management system being capable of instructing a network element to request terminal capability information from the subscriber terminals in a defined area so that the network element obtains the terminal capability information from the subscriber terminals;
the network management system being capable of arranging for a selection functionality to compare the terminal capability information with capability requirement information and select selected subscriber terminals on the basis of their capability information;
the network management system being capable of sending a trace activation command to subscriber terminals; and
the network management system being capable of receiving measurement data measured by the selected subscriber terminals.

According to a fourth aspect of the invention there is provided a computer program product comprising software code that when executed on a computing system performs a method of determining geographical determination of coverage in a communications system by obtaining measurement data provided by a plurality of subscriber terminals the method comprising the steps of:
requesting terminal capability information from the subscriber terminals in a defined area;
obtaining the terminal capability information from the subscriber terminals;
comparing the terminal capability information with capability requirement information;
selecting selected subscriber terminals on the basis of their capability information;
sending a trace activation command to the selected subscriber terminals; and
receiving measurement data measured by the selected subscriber terminals.

Preferably, the computer program product has executable code portions which are capable of carrying out the steps of the method.

Preferably, the computer program product is stored on a computer-readable medium.

Embodiments of the invention will now be described, by way of example only, with reference to the accompanying drawings in which.

Figure 1:
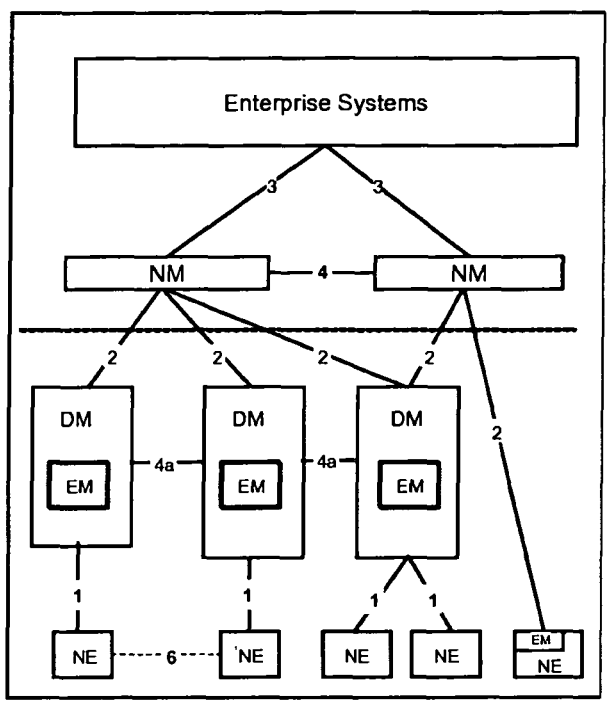
FIG. 1 shows a management architecture.

FIG. 1 has been described in the foregoing.

Two embodiments of the invention will now be described. Both embodiments relate to a situation in which a network operator decides to carry out a geographical determination of coverage, for example the coverage provided by a particular base station, that is a node B or an eNB, in a particular cell. The network operator submits a request for coverage determination into a network management system of the network which results in the network management system identifying a particular geographical area, for example a particular cell. The network management layer then uses lower hierarchical layers in the management architecture described in relation to FIG. 1 to carry out the automatic coverage determination. In doing this, both embodiments obtain UE terminal capability information in respect of mobile terminals present in the relevant geographical area, select ones of the available mobile terminals which are suitable for providing measurement data, and then use an appropriate trace procedure to get the measurement data.

In a first embodiment, the UE capability information is obtained from mobile terminals in the relevant geographical area and is sent to the network management system together with an IMEI and/or IMSI for each mobile terminal obtained from the core network, for example from the MSC, the SGSN, or the MME. The network management systems then determines which mobile terminals are to be used to provide measurement data. The network operator initiates an IMEI or IMSI based trace in the network for those IMEIs/IMSIs that are in the relevant geographical area and have the requested capabilities as will now be described with reference to FIG. 2. This shows a message flow, or sequence, diagram according to the first embodiment having the following messages and/or steps initiated by the network operator providing a suitable request or command to the NM layer:

1. An IRP Manager function in the NM layer sends a Start MDT message to an IRP Agent function in the EM layer. This is needed in order to start the procedures in the network to get UE capability information together with the IMEI or IMEISV in a certain geographical area.

2. The Start MDT message is forwarded by the IRP Agent to an appropriate network element in the core network. Although this is shown to be an MME/SGSN/MSC this element could instead be an eNB/RNC. All that is required is that the network element is able to communicate with the core network to get relevant identifiers of mobile terminals and/or subscribers located in the relevant part of the network. The network element in the core network is configured to obtain information about the capabilities of the mobile terminals that are registered in the desired geographical area. The geographical area is identified by the cell ID which is present in the Start MDT message. The network element in the core network determines which mobile terminals are present in the relevant geographical area. It also obtains the IMEIs or IMSIs of these mobile terminals.

3. The network element in the core network communicates with the mobile terminals present in the relevant geographical area via a suitable network element or suitable network elements in the radio access network and in respect of each mobile terminal obtains its capability information. This can be carried out as a broadcast request to the mobile terminals or as individual and specific requests to each of the mobile terminals. The network element in the core network then takes a set of capability information in respect of each mobile terminal and adds to the set the relevant IMEI information.
4. The network element in the core network sends a notify message notifying the capability information and associated IMEIs of respective mobile terminals to the network management system. The message is received by the IPR Agent.
5. The IRP Agent sends a notify message notifying the capability information and associated IMEIs/IMSIs of respective mobile terminals to the IRP Manager. Once the IRP Manager has received this information, it refers to network operator policy information and compares policy information to the capability information for the terminals and identifies those terminals which are suitable to be used to provide measurement data. It also identifies the IMEIs/IMSIs in respect of these mobile terminals. In both this embodiment and the following embodiment, the policy information may include required capabilities such as the mobile terminals supporting GPS, the mobile terminals having more that a specified amount, say 80%, of their available battery capacity, and total or available memory space greater than a specified amount, for example greater than 100 kBytes.
6. The IRP Manager activates an IMEI/IMSI-based trace only in respect of those mobile terminals having capability information which meets the criteria set out in the network operator policy information by sending a trace activation message to the IRP Agent. The trace activation is done on the basis of IMEI or IMEISV or IMSI.
7. The IRP Agent forwards the trace activation message to the core network, for example to one or more of the MME/SGSN/MSC-S network elements in the case that signaling based trace activation is to occur or to the RAN, for example to the eNB/RNC, in the case that management based trace activation is to occur.
8. The core network forwards the trace activation message to the radio access network, for example to an eNB/RNC network element.
9. The eNB/RNC network element activates a trace in respect of the selected mobile terminal, for example in accordance with the standard 3GPP TS 32.422. This can be either signaling based or management based trace activation.
10. When any activity is done by the traced mobile terminal which is relevant to the trace, the activity is logged and in addition location information is obtained at a time associated with the logging of the activity. The logged information and associated location information is forwarded to the TCE as defined by 3GPP TS 32.422 and 32.423. The information is provided by an individual mobile terminal as a trace log and is then collated at the eNB/RNC into trace records for sending on to the TCE. However, the eNB/RNC may instead send individual trace records to the TCE in respect of individual mobile terminals.

Based on this architecture the UE capability information is sent from the eNB/RNC to the NM layer via the Itf-N interface.

Figure 2:
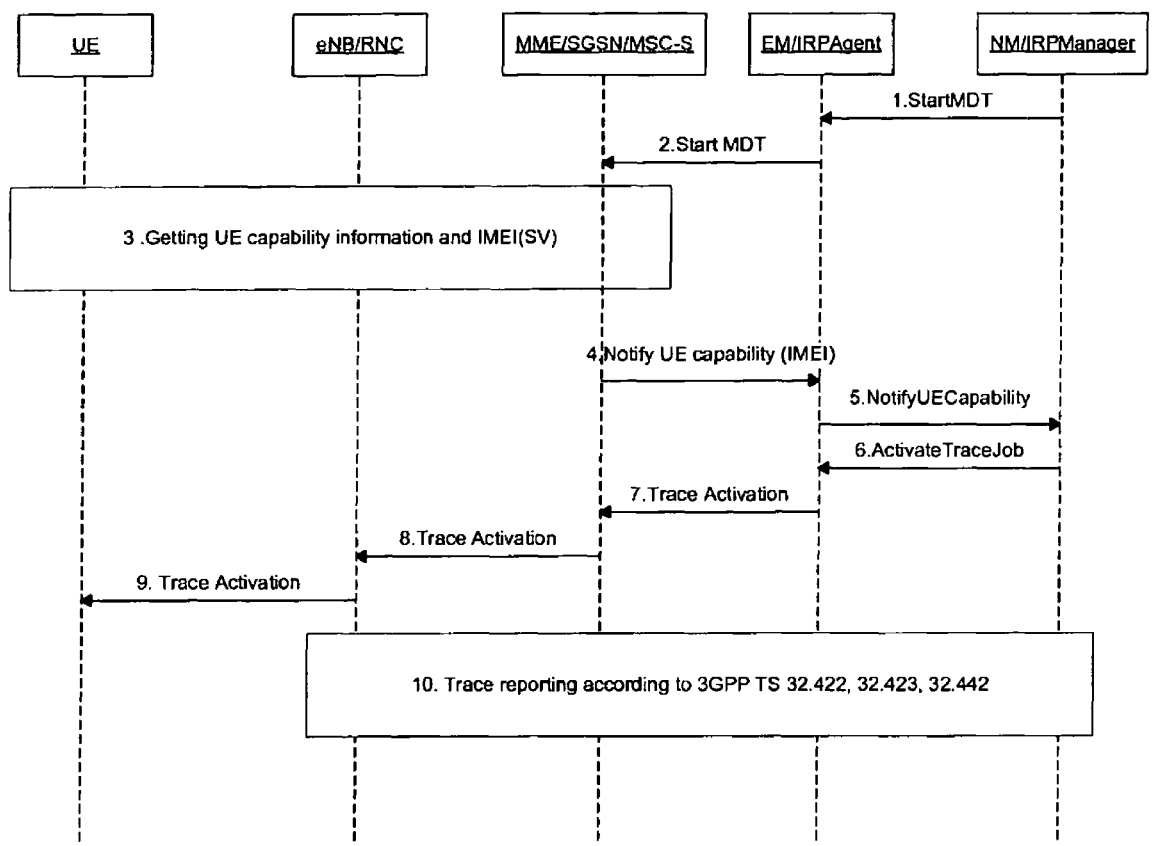
FIG. 2 shows a message flow diagram according to a first embodiment of the invention.

It should be noted in relation to FIG. 2 that the command ActivateTraceJob includes a flag which indicates that the trace activation is being carried out in respect of an MDT operation. The trace activation which is generated in the IRP Agent and is conveyed to the mobile terminal also carries this flag so it can be received by the mobile terminal which then understands that it needs to carry out additional measurements related to MDT.

Figure 3:
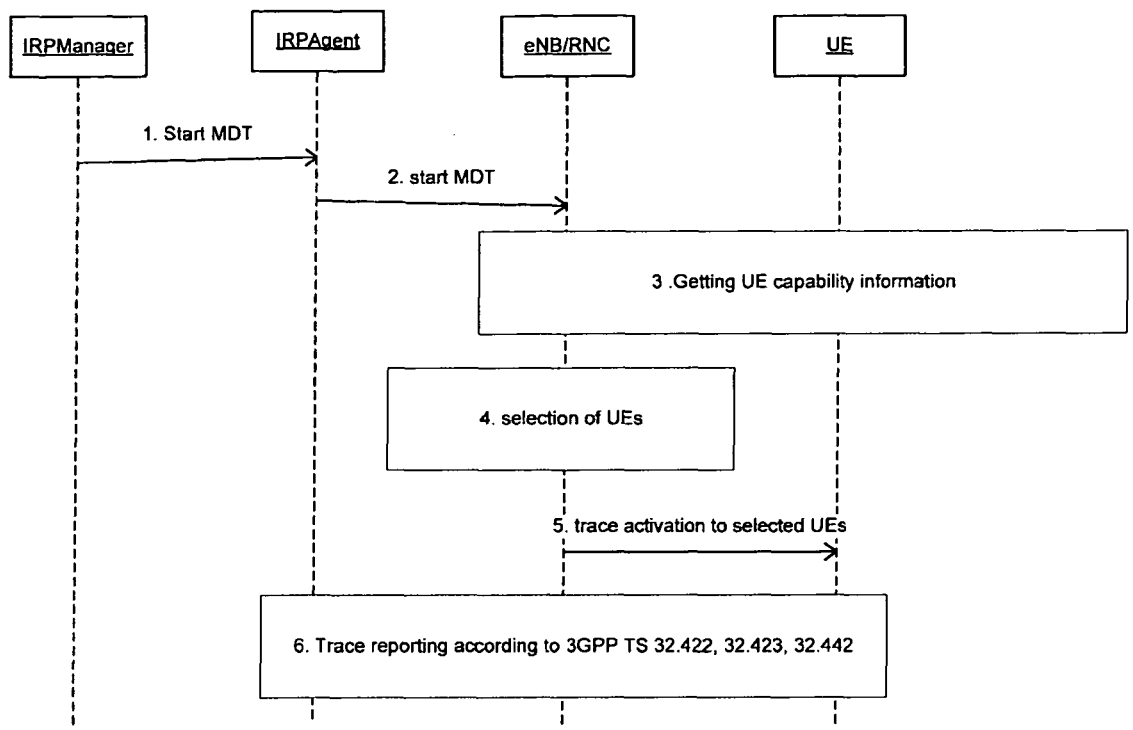
FIG. 3 shows a message flow diagram according to a second embodiment of the invention.

In a second embodiment, an operator policy information relating to mobile terminal capabilities, such as the desired capabilities required for participating in measurement data collection and/or delivery, is transferred from a network management system to a network element in the RAN of the network. The policy information may be sent for each coverage check or automatically sent from time to time. The UE capability information is obtained from mobile terminals in the relevant geographical area by the network element in the RAN which then uses the operator policy information to determine which mobile terminals are to be used to provide measurement data. The network element in the RAN initiates a cell based trace for those mobile terminals that are in the relevant geographical area and have the requested capabilities as will now be described with reference to FIG. 3. This shows a message flow, or sequence, diagram according to the second embodiment having the following messages and/or steps initiated by the network operator providing a suitable request or command to the NM layer.

1. An IRP Manager function in the NM layer sends a Start MDT message to an IRP Agent function in the EM layer. This operation contains the operator policies regarding collection of measurement data and includes a detailed list of criteria of the kinds of mobile terminals should participate in the data collection for MDT. This is needed in order to start the procedures in the network to gather UE capability information in a certain geographical area.
2. The Start MDT message is forwarded by the IRP Agent to an appropriate network element in the RAN, for example an eNB/RNC. The network element in the RAN is configured to obtain the UE capability information of the mobile terminals that are registered in the desired geographical area. The geographical area is identified by the cell ID. The network element in the RAN determines which mobile terminals are present in the relevant geographical area.
3. The network element in the RAN communicates with the mobile terminals present in the relevant geographical area and in respect of each obtains its capability information.
4. The network element in the RAN refers to the network operator policy information it received in step 2 and compares it to the capability information for the mobile terminals and identifies those mobile terminals which are suitable to be used to provide measurement data. If a match is found and a mobile terminal is selected (steps 3. and 4.), the eNB/RNC can use the selected mobile terminal for measurement data collection for MDT purposes. To do this it configures the selected mobile terminal for MDT data collection by sending a trace activation to the selected mobile terminals as is now described in the following step 5.
5. Based on this selection, a trace is activated in respect of each of the selected mobile terminal. This is referred to in the Figure as "trace activation to selected UEs". The trace activation contains a trace reference, the IP address of the TCE (where to send the trace log), and possibly some additional information about MDT, for example whether it is necessary for the mobile terminal to include GPS data with the measurement data when it sends a trace log to the eNB/RNC. In response to receiving the trace activation the mobile terminal starts its MDT logging feature, that is it starts measuring additional new mobile terminal measurements and if needed saves the GPS data together with those measurements.

6. When any activity is done by the traced mobile terminal which is relevant to the trace, the activity is logged and in addition location information is obtained at a time associated with the logging of the activity. The logged information and associated location information is forwarded to the TCE as defined by 3GPP TS 32.422 and 32.423. The information is provided by an individual mobile terminal as a trace log and is then collated at the eNB/RNC into trace records for sending on to the TCE. However, the eNB/RNC may instead send individual trace records to the TCE in respect of individual mobile terminals.

In this embodiment of the invention, the Start MDT command is a modified version of an ActivateTraceJob command. Both commands contain the parameters:

iOCInstance which specifies the DN of ManagedEntity instance where Trace Session is to be activated;

listOfInterfaces;

listOfNeTypes which specifies the type of ManagedFunctions;

traceDepth which shows the traceDepth set to the Trace Session;

traceReference which identifies the TraceSession;

traceTarget which specifies whether the trace shall be activated by IMSI, IMEI (SV), Public ID, Cell (identified by its DN id) and in the case that an ActivateTraceJob command or Start MDT command is used to request a cell trace, the traceTarget parameter contains the cell where the trace is to be activated.

triggeringEvent; and traceCollectionEntityAddress which specifies the address to the TCE that is associated to the TraceJob.

In addition, the Start MDT command contains the UE capability requirements as an additional parameter or set of parameters.

The Start MDT command, on being received by eNB/RNC, acts as a trigger for the following steps to occur:

1) send a UE capability information request to the mobile terminals which it is serving (or a sub-set of such mobile terminals, for example selected randomly) requesting them to provide a UE capability information report to the eNB/RNC of a predetermined set of UE capability information or of UE capability information identified in the UE capability information request;

2) receive the UE capability information report containing the UE capability information and extract them from the UE capability information report;

3) compare the extracted UE capability information with the UE capability requirements;

4) identify selected mobile terminals having a set of UE capability information which match the UE capability requirements;

5) generate separate trace activations in respect of the selected mobile terminals on the basis of the Start MDT command and send the trace activations to the selected mobile terminals; and 6) report measurement data gathered as a result of the trace activation in respect of the selected mobile terminals.

As is apparent, in this embodiment the network operator policy information is transferred from the network management system to the network so the network can select the appropriate mobile terminals for the collection of measurement data.

In this embodiment, a mobile terminal and the eNB/RNC by which it is served communicate according to connection orientated signaling, the connection having been established and being maintained according to the Radio Resource Control (RRC) protocol. The eNB/RNC uses the connection orientated signaling to request the UE capability information from the mobile terminals it serves and once the respective served mobile terminals have gathered the relevant information concerning their capabilities, they likewise can send a UE capability information report according to the connection orientated signaling to the eNB/RNC. The eNB/RNC also uses the connection orientated signaling to send the trace activations to the served mobile terminals and once the respective served mobile terminals have gathered the relevant measurement data, they likewise can send a trace log according to the connection orientated signaling to the eNB/RNC. In this case the trace activation does not have to contain a specific identifier of a mobile terminal and only needs to contain that information referred to above, that is the address of the TCE and a trace reference.

The mobile terminal may send the measurement data to the eNB/RNC in a number of ways. It may use RRC MEASUREMENT REPORT messages, that is the messages periodically sent by a mobile terminal to a network indicating the radio conditions it is experiencing at the time of making the measurements, that is downlink-based measurements. It may contain indications of signal strength of base stations which are potential handover candidates. In one embodiment of the invention, the MEASUREMENT REPORT messages may be modified to contain additional mobile terminal measurement data together related to the MDT feature (such as those referred to in the foregoing) with GPS data as an additional parameter. The measurement data in a particular MEASUREMENT REPORT message (either that normally present in a MEASUREMENT REPORT message, additional mobile terminal measurement data, or both) applies to a particular time at which the GPS data was recorded or cover a particular time period during which the GPS data was recorded. The modified MEASUREMENT REPORT message may also contain a time stamp.

In another embodiment of the invention, the additional mobile terminal measurement data together with the GPS data is sent in a new RRC signaling message rather than in a modified RRC MEASUREMENT REPORT message.

As referred to above, both in relation to the first and second embodiments of the invention, the mobile terminal may carry out a number of additional mobile terminal measurements related to the air interface for MDT purposes. For example, it may carry out one or more of the following:

i) periodic downlink pilot measurements;

ii) specified measurements if a specified serving cell metric becomes worse than a configured threshold;

iii) specified measurements if the mobile terminal transmit power headroom becomes less than a configured threshold;

iv) specified measurements if a random access failure occurs;

v) specified measurements if the mobile terminal fails to decode a particular channel a specified number of times; or vi) specified measurements if the mobile terminal fails to read a specific common channel to acquire required system information for camping on a cell, for example a broadcast channel.

In respect of i), the following parameters may be measured—the location at which concerned measurements took place, and the respective times of the measurements, the cell at which the measurement took place, and the cell measurements themselves.

In respect of measurements taken in response to a trigger, the following parameters may be measured (as appropriate)—the location at which concerned trigger took place and the location at which concerned measurements took place, and the respective times of the triggers and the measurements, the cell at which the concerned trigger took place, cell measurements that are available at the occurrence of the trigger and cell measurements that are available during a certain period before and after the occurrence of concerned trigger. In the case of failures related to channels, the failure cause for each failure may be recorded and also the channel type for which failure happens.

The mobile terminal may store one of more of these sets of measurements and then report them in response to a trace activation carried out to that mobile terminal by the network.

The mobile terminals send measurement reports, whether in the form of modified MEASUREMENT REPORT messages or new RRC signaling messages, together with the GPS data whenever they have been activated to perform MDT measurement data collection. That is, if the trace is activated to the mobile station, then the mobile station sends the measurement reports together to the network automatically. As a result, a number of trace logs are generated by respective mobile terminals as a result of one Start MDT command and can be reported to the network management system as a number of separate trace reports or as a combined trace report, with one trace log coming from one mobile terminal as a result of one trace activation. As mentioned in the foregoing, each mobile terminal may send its own trace log with the GPS data to the eNB/RNC and the eNB/RNC may then combine several mobile terminal trace logs into one trace report.

It will be understood that the network, for example the eNB/RNC may also generate measurement data, for example indicating the radio conditions it is experiencing at the time of making the measurements, that is uplink-based measurements.

Whether the eNB/RNC receives a modified MEASUREMENT REPORT message containing additional mobile terminal measurement data related to the MDT feature together with the GPS data as an additional parameter or whether the eNB/RNC receives conventional MEASUREMENT REPORT messages and a new RRC signaling message containing the additional mobile terminal measurement data together with the GPS data, both kinds of data, that it that present in a conventional MEASUREMENT REPORT message and additional mobile terminal measurement data and the GPS data as an additional parameter, can be provided to the network management system for the purposes of determining network coverage. In addition, any measurement data generated by the eNB/RNC related to uplink radio conditions may also be included. In order to include different types of data in this way, that is generated by different parts of the communication system and generated for different purposes, time stamps associated with different data items, for example associated with conventional measurement data in MEASUREMENT REPORT messages, the additional mobile terminal measurement data, the GPS data, and measurement data generated by the eNB/RNC, may be correlated.

As will be apparent from the foregoing, there are a number of differences between the first and the second embodiments. One difference is that although both embodiments both have a Start MDT message, these are different messages which cause different outcomes. In the first embodiment, the Start MDT message triggers the gathering of mobile terminal capability information and a mobile terminal or subscriber identifier. A trace activation is then a later operation which occurs once the network management system has received and processed the mobile terminal capability information. It is only after this point that trace activation occurs. In the second embodiment, the Start MDT message is a modified trace activation message and so this message triggers both the gathering of mobile terminal capability information and trace activation. However, it does not trigger to obtaining of a mobile terminal or subscriber identifier.

A communication system according to the invention may be configured to carry out a coverage investigation either in a reactive mode, for example as a result of a network management system noticing that key performance indicators, such as a high rate of dropped calls, indicate a problem in a cell, or in a proactive mode, for example following an environmental change in the geographical area covered by a network (this could be caused by a building being erected) it is desired to check if network coverage is affected. The system may be configured to operate both in reactive mode and in proactive mode.

An advantage of the invention is that trace functionality can be used for configuring selected mobile terminals for data collection and the trace functionality ensures that the measurement data related to measurements carried out in the network and measurements carried out in the mobile terminal can be transferred to the same place, that is the same entity, and these two types of data can be readily correlated.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of determining geographical determination of coverage in a communications system by obtaining measurement data provided by a plurality of subscriber terminals the method comprising the steps of:
   requesting terminal capability information from the subscriber terminals in a defined area;
   obtaining the terminal capability information from the subscriber terminals;
   comparing the terminal capability information with capability requirement information;
   selecting selected subscriber terminals on the basis of their capability information;
   sending a trace activation command to the selected subscriber terminals; and
   receiving measurement data measured by the selected subscriber terminals,
   wherein policy information relating to subscriber terminal capability requirements is transferred from a network management system to a network element in a radio access network, and
   wherein the policy information request is a modified version of an ActivateTraceJob command which has been modified to contain subscriber terminal capability requirements as an additional parameter or set of parameters.

2. A method according to claim 1 in which a network management system requests a network element present in a radio access network to obtain terminal capability information.

3. A method according to claim 1 in which the terminal capability information is provided to the network element to be used by that network element to select the selected subscriber terminals.

4. A method according to claim 3 in which the trace activation command is modified by the network element from a cell trace command into a plurality of individual trace commands to be sent to ones of selected subscriber terminals.

5. A method according to claim 4 in which the plurality of individual trace commands are addressed to ones of the selected subscriber terminals by connection orientated signalling.

6. A method according to claim 1 in which the policy information is included in a request for selected subscriber terminals to carry out and provide measurement data.

7. A method according to claim 1 in which the policy information is compared with the capability information in order to select subscriber terminals which are suitable to be used to provide measurement data.

8. A method according to claim 2 in which the terminal capability information is obtained by the network element and then provided to the network management system to be used by that system to select the selected subscriber terminals.

9. A method according to claim 8 in which the following the selection of the selected subscriber terminals, the network management systems sends a trace command based on an equipment or a subscriber identifier.

10. A method according to claim 1 in which the subscriber terminal receives a trace activation and as a result provides measurement data which has been automatically measured by the subscriber terminal prior to receiving the trace activation.

11. A method according to claim 1 in which once subscriber terminals have been selected, the network element configure them for data collection by sending to them a trace activation.

12. A method according to claim 1 in which the subscriber terminal measures location data which is associated with the measurement data.

13. A method according to claim 1 in which the geographical determination of coverage is carried out in a mobile communications system.

14. A communications system capable of determining geographical coverage by obtaining measurement data provided by a plurality of subscriber terminals comprising:
 a network management system;
 a radio access network comprising at least one network element; and
 a selection functionality;
 the network element being capable of requesting terminal capability information from the subscriber terminals in a defined area;
 the network element obtaining the terminal capability information from the subscriber terminals;
 the selection functionality being capable of comparing the terminal capability information with capability requirement information and selecting selected subscriber terminals on the basis of their capability information;
 the network management system being capable of sending a trace activation command to subscriber terminals; and
 the network management system being capable of receiving the measurement data,
 wherein policy information relating to subscriber terminal capability requirements is transferred from the network management system to the network element in the radio access network, and
 wherein the policy information request is a modified version of an ActivateTraceJob command which has been modified to contain subscriber terminal capability requirements as an additional parameter or set of parameters.

15. A network management system capable of requesting and obtaining measurement data provided by a plurality of subscriber terminals in order to determine geographical determination of coverage in a communications system:
 the network management system being capable of instructing a network element to request terminal capability information from the subscriber terminals in a defined area so that the network element obtains the terminal capability information from the subscriber terminals;
 the network management system being capable of arranging for a selection functionality to compare the terminal capability information with capability requirement information and select selected subscriber terminals on the basis of their capability information;
 the network management system being capable of sending a trace activation command to subscriber terminals; and
 the network management system being capable of receiving measurement data measured by the selected subscriber terminals,
 wherein policy information relating to subscriber terminal capability requirements is transferred from the network management system to a network element in a radio access network, and
 wherein the policy information request is a modified version of an ActivateTraceJob command which has been modified to contain subscriber terminal capability requirements as an additional parameter or set of parameters.

16. A computer program product comprising software code that when executed on a computing system performs a method of determining geographical determination of coverage in a communications system by obtaining measurement data provided by a plurality of subscriber terminals the method comprising the steps of:
 requesting terminal capability information from the subscriber terminals in a defined area;
 obtaining the terminal capability information from the subscriber terminals;
 comparing the terminal capability information with capability requirement information;
 selecting selected subscriber terminals on the basis of their capability information;
 sending a trace activation command to the selected subscriber terminals; and
 receiving measurement data measured by the selected subscriber terminals,
 wherein policy information relating to subscriber terminal capability requirements is transferred from a network management system to a network element a radio access network, and
 wherein the policy information request is a modified version of an ActivateTraceJob command which has been modified to contain subscriber terminal capability requirements as an additional parameter or set of parameters.

* * * * *